(No Model.) 3 Sheets—Sheet 3.
E. BOILEAU.
GRATE BAR FOR FURNACES.
No. 403,730. Patented May 21 1889.
FIG. X.
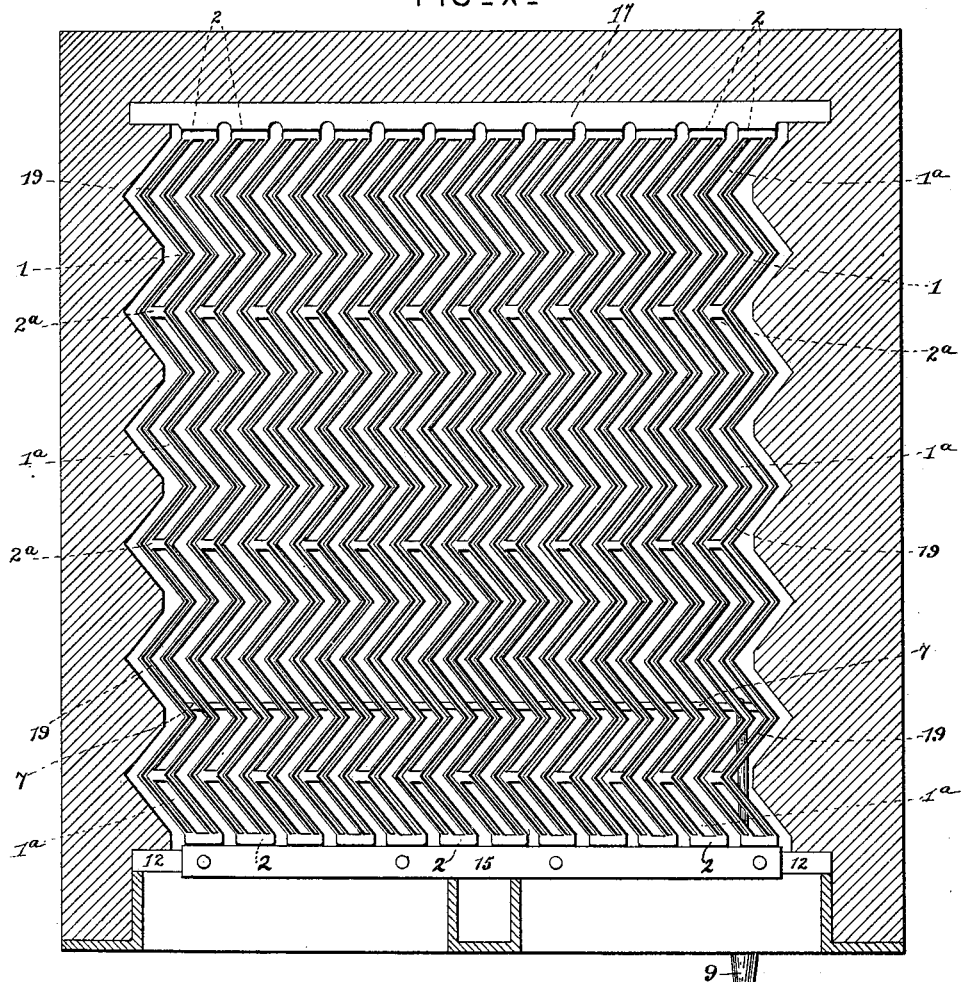
FIG. XI.
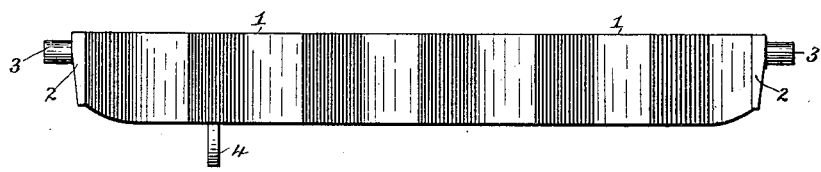
Attest:
Walter Allen
Geo. L. Wheelock
Inventor:
Etienne Boileau
by Knight Bros
attys.

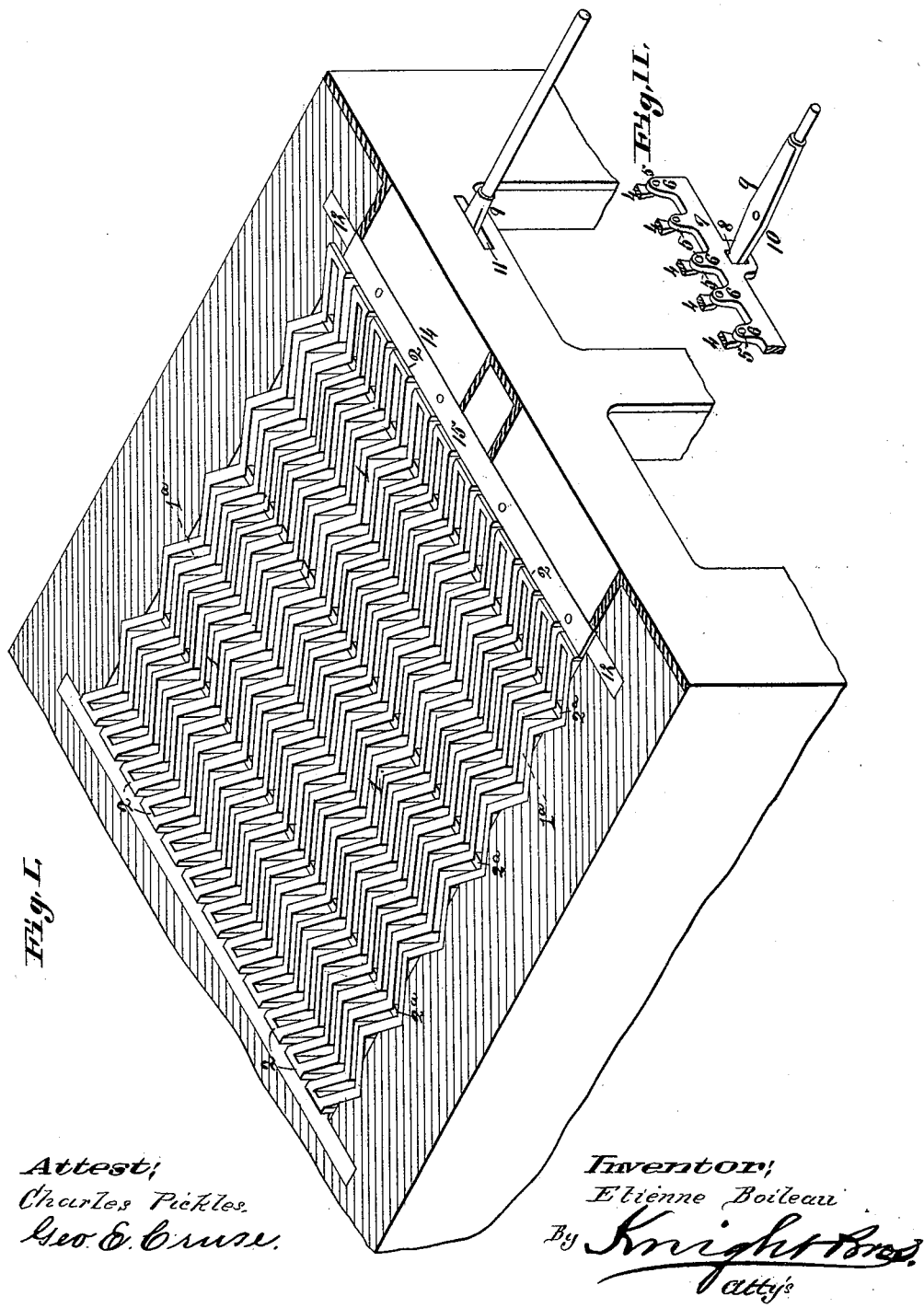

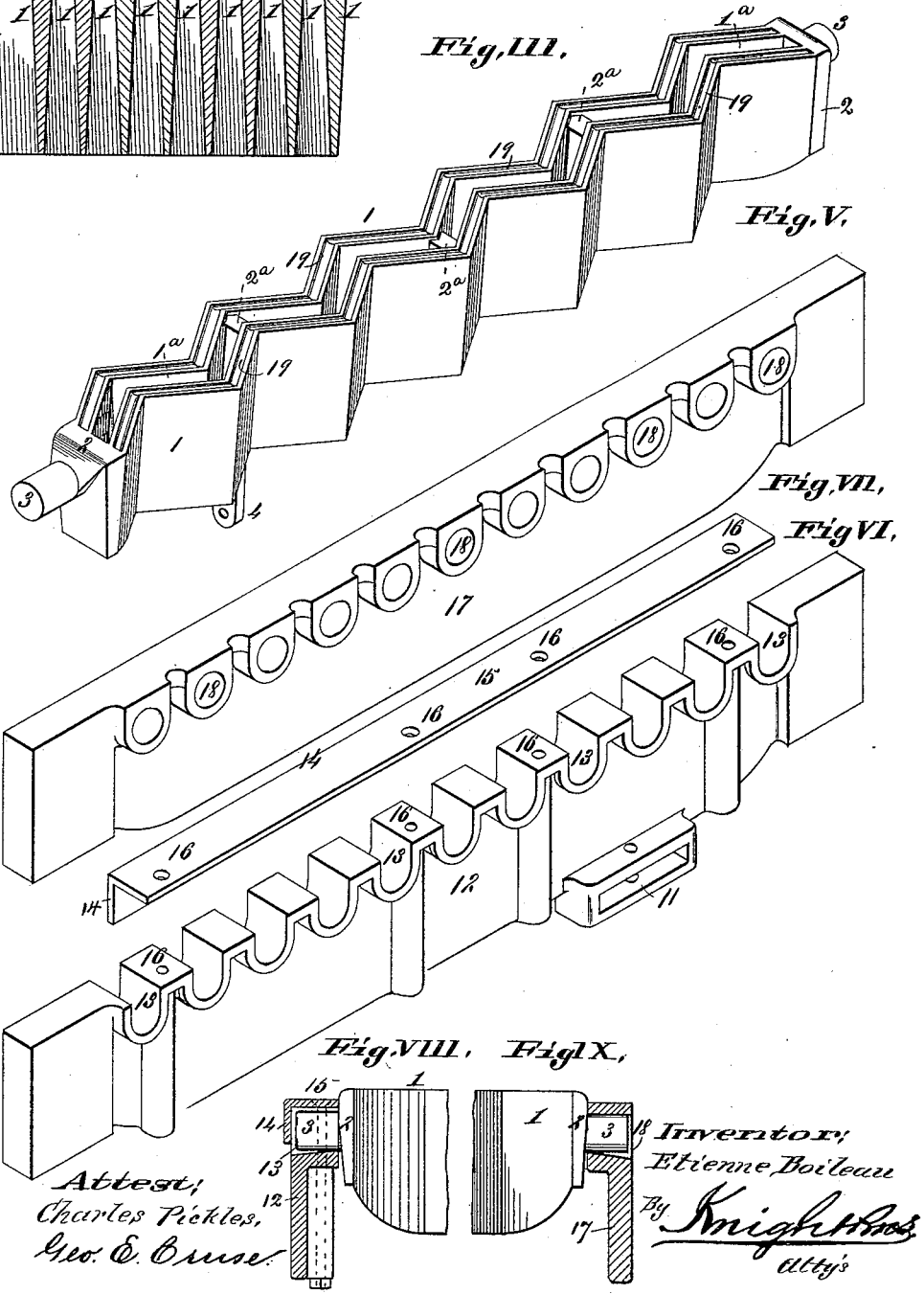

UNITED STATES PATENT OFFICE.

ETIENNE BOILEAU, OF ST. LOUIS, MISSOURI, ASSIGNOR TO LUZERNE J. PECK, OF SAME PLACE.

GRATE-BAR FOR FURNACES.

SPECIFICATION forming part of Letters Patent No. 403,730, dated May 21, 1889.

Application filed August 6, 1888. Serial No. 282,033. (No model.)

*To all whom it may concern:*

Be it known that I, ETIENNE BOILEAU, of the city of St. Louis, in the State of Missouri, have invented a certain new and useful Improvement in Grate-Bars for Furnaces, of which the following is a full, clear, and exact description, reference being had to the accompanying drawings, forming part of this specification.

My invention relates to an improved zigzag rocking grate-bar; and it consists in the construction hereinafter described, and pointed out in the claim.

Figure I is a perspective view of a grate formed of my grate-bars, the furnace-walls being shown in section. Fig. II is a detail perspective view of part of the bar by which the grate-bars are rocked and of the lever by which it is agitated. Fig. III is a perspective view of a grate-bar in a tipped position. Fig. IV is a transverse section of a number of grate-bars. Fig. V is a front perspective view of the rear bearing-bar. Fig. VI is a rear perspective view of the front bearing-bar. Fig. VII is a perspective view of an angle-bar used as a cap to the front bearing-bar. Figs. VIII and IX are respectively detail longitudinal sections of front and rear bearing-bars on the central lines of the gudgeons on which the grate-bar rocks. Fig. X is a plan view of a grate having my improved grate-bars. Fig. XI is a side view of a grate-bar.

By referring to Fig. III it will be seen that the bar is formed in two zigzag webs, 1 1, connected together at the ends 2, forming openings 1ª, extending between the webs the whole length thereof, except at long distances, where a short block, 2ª, is located, and having at each end a similar gudgeon, 3, on which the bar is supported on which it may be rocked. Each bar has at bottom, and preferably near to its front end, as shown in Fig. III, a lug, 4, which is connected by a pivot, 5, to one of the lugs 6 on a slide-bar, 7, that extends transversely beneath the grate-bars, to all of which it is connected in the manner described. The bar 7 has an aperture, 8, in which engages the inner end of the shaking-lever 9, said lever being fulcrumed at 10 in a bearing, 11, beneath the front bearing-bar, 12. The front bearing-bar has a number of recesses, 13, in which the gudgeons 3 of the front end of the grate-bars fit neatly and easily, so that the grate-bars may be readily rocked on the gudgeons. The gudgeons are prevented from escaping from the recesses by an angle-bar, 14, the horizontal part 15 of which lies on top of the bearing-bar. The cap is attached to the bearing-bar 12 by screws engaging in the holes 16 of the cap and bar. The rear bearing-bar, 17, has holes or sockets 18 for the reception of the rear gudgeons of the grate-bars. I form the upper edges of the webs of the grate-bars with grooves 19.

I claim as my invention—

A grate-bar constructed with two zigzag webs, 1, having their upper edges formed with grooves 19, the ends 2 forming with the webs an opening, 1ª, the short blocks connecting the webs at long distances, the gudgeons 3 on the ends, and the lug 4 for rocking the bar, substantially as described.

ETIENNE BOILEAU.

In presence of—
EDW. S. KNIGHT,
JOS. WAHLE.

It is hereby certified that Letters Patent No. 403,730, granted May 21, 1889, upon the application of Etienne Boileau, of St. Louis, Missouri, for an improvement in "Grate-Bars for Furnaces," were erroneously issued to "Luzerne J. Peck" as assignee of the entire interest in said invention; that said Letters Patent should have been issued to *Etienne Boileau and Luzerne J. Peck jointly*, said Peck being assignee of one-half interest only as shown by the record of assignments in this office; and that said Letters Patent should be read with this correction therein that the same may conform to the record of the case in the Patent Office.

Signed, countersigned, and sealed this 4th day of June, A. D. 1889.

. [SEAL.]
CYRUS BUSSEY,
*Assistant Secretary of the Interior.*

Countersigned:
C. E. MITCHELL,
*Commissioner of Patents.*